United States Patent [19]

Pava

[11] Patent Number: 4,850,616
[45] Date of Patent: Jul. 25, 1989

[54] FLEXIBLE JOINT CAPABLE OF USE IN THE O'CONNOR COMBUSTOR COAXIAL PIPING

[75] Inventor: Ronald Pava, West Mifflin, Pa.

[73] Assignee: Westinghouse Electric Corp., Pittsburgh, Pa.

[21] Appl. No.: 158,018

[22] Filed: Feb. 19, 1988

[51] Int. Cl.[4] .............................................. F16L 53/00
[52] U.S. Cl. ..................................... 285/41; 285/135; 285/330
[58] Field of Search ..................... 285/133.1, 135, 330, 285/134, 41; 464/17, 24, 112

[56] References Cited

U.S. PATENT DOCUMENTS

| | | | |
|---|---|---|---|
| 916,301 | 3/1909 | Greenlaw | 285/264 |
| 1,494,465 | 5/1924 | Dunn . | |
| 2,266,383 | 12/1941 | Quintrell | 255/1.6 |
| 2,369,849 | 2/1945 | Phillips | 285/135 X |
| 2,437,385 | 3/1948 | Halford | 285/135 |
| 2,462,734 | 2/1949 | Ferris | 285/135 X |
| 2,546,442 | 3/1951 | Guy | 158/109 |
| 2,705,650 | 4/1955 | McLean Saum | 285/9 |
| 2,780,079 | 4/1952 | Wahlberg | 64/7 |
| 3,359,758 | 12/1967 | Hamel . | |
| 3,633,384 | 1/1972 | Jarren | 64/31 |
| 3,678,810 | 7/1972 | Holmes | 285/133.1 X |
| 3,857,256 | 12/1974 | Giruis | 64/21 |
| 3,938,833 | 2/1976 | Miyaoka | 285/166 |
| 4,425,965 | 11/1984 | Bayh, III et al. | 166/106 |
| 4,465,308 | 8/1984 | Martini | 285/177 |

FOREIGN PATENT DOCUMENTS 1160247 12/1963 Fed. Rep. of Germany ... 285/133.1

Primary Examiner—Dave W. Arola

[57] ABSTRACT

A flexible joint capable of use with an O'Connor combustor is disclosed. The joint permits at least a 2° flex, allowing for transient misalignments between the combustor and rotary joint, minimizing damage to rotary joint seals.

14 Claims, 5 Drawing Sheets

FLEXIBLE JOINT CAPABLE OF USE IN THE O'CONNOR COMBUSTOR COAXIAL PIPING

FIELD OF THE INVENTION

The present invention relates to flexible joints, particularly those useful in connection with the coaxial piping of an O'Connor combustor.

BACKGROUND OF THE INVENTION

An O'Connor combustor is a large, cylindrical combustor in which solid municipal waste is burned. The combustor may be up to 60 feet long, up to 10 feet in diameter, an weigh up to 100,000 pounds. The combustor operates in a rotary manner, with waste being injected in one end, which is elevated relative to the other end, from which non-combustibles are removed following the combustion step.

The O'Connor combustor is water-cooled, water being injected into the combustor through a rotary joint, which allows water in and steam out of the combustor while simultaneously permitting the combustor to rotate.

In order for the rotary joint seals to function properly, it is necessary to align the combustor as nearly as possible with the welded pipes connecting the combustor to the rotary joint. If the combustor is only slightly out of alignment, the seals on the rotary joint wear out quickly. However, the combustor's weight and size makes it impossible to achieve proper alignment during rotation. As a result, the rotary joint seals must constantly be replaced in current systems, regardless of the amount of care taken to achieve alignment of the combustor.

SUMMARY OF THE INVENTION

The present invention solves the problems encountered by prior systems through the use of a flexible joint connecting the combustor to the rotary joint. In one embodiment of the invention, the flexible joint includes an outer annular channel with outer couplings at either end. One coupling connects the flexible joint to the combustor, while the other coupling connects the flexible joint to the rotary joint.

The outer annular channel includes a section of pipe between the outer couplings. This section includes a bearing at either end. Each bearing rides within one of the outer couplings. The flexible joint also includes an inner annular channel that rides substantially concentrically within the outer annular channel. The inner annular channel has a socket at either end, with each socket being positioned substantially on a center line with one of the outer couplings of the outer annular channel. The inner annular channel also includes a section of pipe between the two sockets, and this section includes a bearing at either end, with each bearing riding within one of the sockets.

The flexible joint is designed such that water may be carried by the inner annular channel, and steam may be carried by the outer annular channel, in the space outside the inner annular channel. The flexible joint allows for flex of at least 2°.

Other details, objects and advantages of the invention will become apparent as the following description of the presently preferred embodiments and presently preferred methods of practicing the invention proceeds.

BRIEF DESCRIPTION OF THE DRAWINGS

In the accompanying drawings, the preferred embodiments of the invention and preferred methods of practicing the invention are illustrated in which.

DETAILED DESCRIPTION OF THE INVENTION

Figure 1:
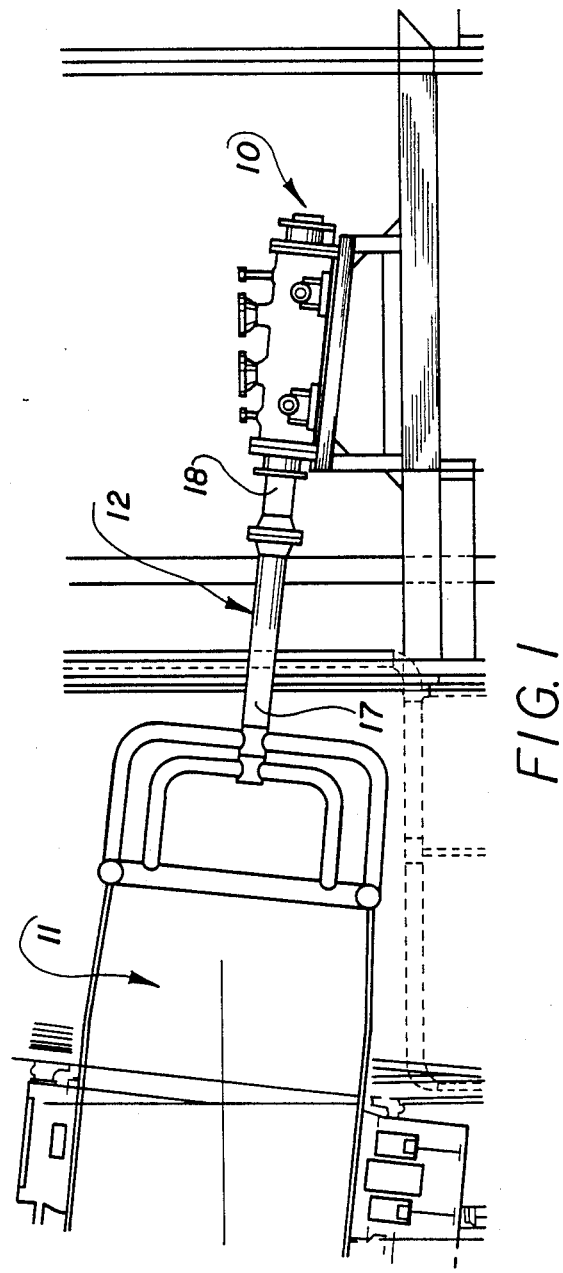
FIG. 1 is an elevation view illustrating a prior connection for the combustor to the rotary joint.

FIG. 1 illustrates a prior configuration for connecting a rotary joint 10 to a combustor 11. As shown, the combustor 11 is aligned with the rotary joint 10 and connected thereto by means of a welded pipe assembly 12.

Figure 2:
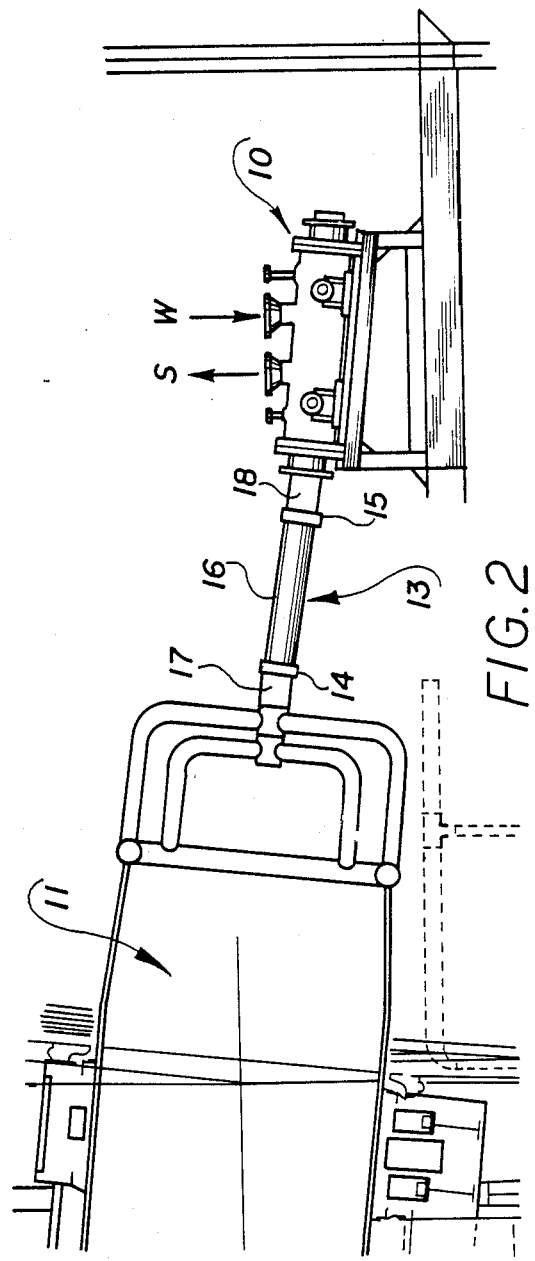
FIG. 2 is an elevation view illustrating the flexible joint of the present invention in use with a combustor and rotary joint.

FIG. 2 illustrates a preferred embodiment of the present invention in which a flexible joint 13 replaces part of the welded pipe assembly of the FIG. 1 configuration. The flexible joint 13 has an outer annular channel 16 which includes a first coupling 14 which connects the joint 13 to the combustor 11 and a second coupling 15 which connects the flexible joint 13 to the rotary joint 10. The first coupling 14 is preferably welded or bolted to the pipe 17 which is cut away to accept the joint 13, and the second coupling is preferably welded or bolted to the pipe 18 connected to the rotary joint 10.

Figure 3:
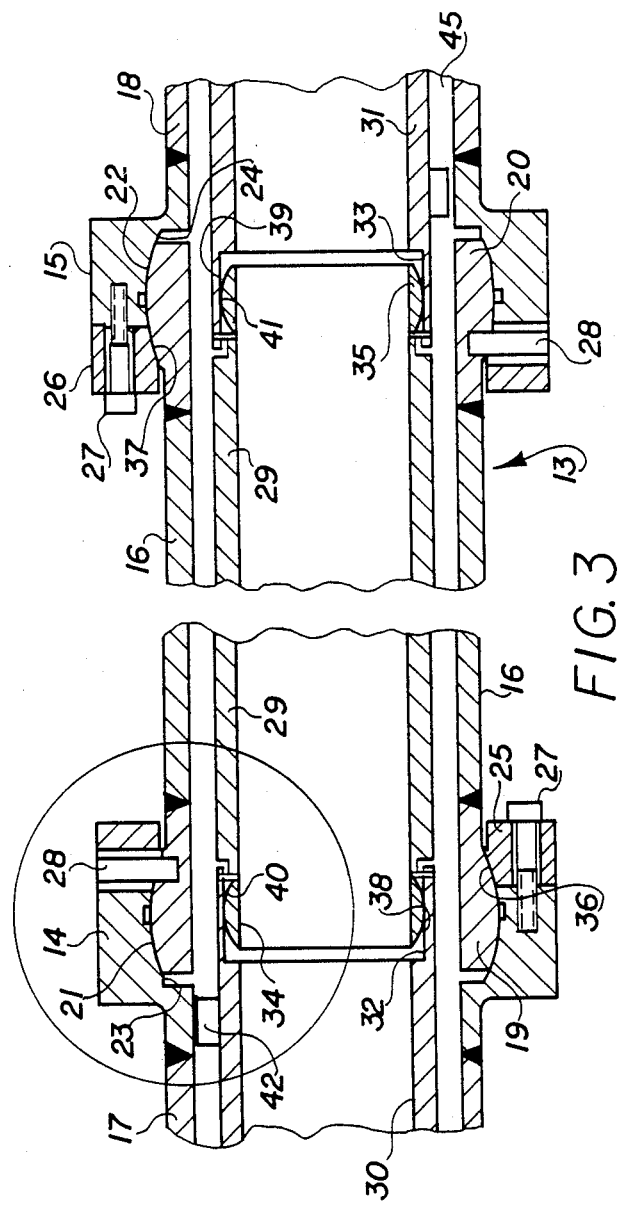
FIG. 3 is a sectional view of one preferred embodiment of the invention.
Figure 5:
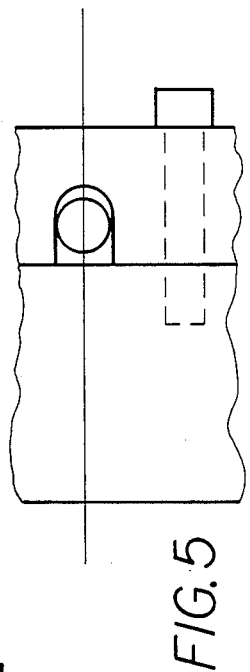
FIG. 5 is a detailed view illustrating the typical placement of the pins that transmit torque through the joint in a rotational direction.

FIG. 3 illustrates a preferred embodiment of the present invention in greater detail. As shown, the flexible joint, generally 13, includes an outer annular channel 16 having a first outer coupling 14 at one end thereof and a second outer coupling 15 at the other end thereof. The first outer coupling 14 engages one end of the flexible joint 13 and is connected to a pipe 17 which in turn is connected to the combustor 11, and the second outer coupling 15 engages the other end of the flexible joint 13 and is connected to a pipe 18 which in turn is connected to the rotary joint 10.

The section of the outer annular channel 16 is positioned between the first outer coupling 14 and the second outer coupling 15. At one end of the section of the outer annular channel 16 is a first bearing means 19, and a second bearing means 20 is located at the other end of the section 16. As shown, the first bearing means 19 rides within the first outer coupling 14 and the second bearing means 20 rides within the second outer coupling 15. The bearing means 19 and 20 are secured within the couplings 14 and 15 by a split ring flange 25 and 26, respectively. Each split ring flange 25 and 26 is secured to its respective coupling 14 and 15 in any suitable manner, for example by bolts 27.

In one preferred embodiment of the invention, the first and second bearing means 19 and 20 have a curved profile, 21 and 22, respectively, as shown. In this embodiment, the inner surfaces 23 and 24, respectively, of the first outer coupling 14 and second outer coupling 15 are curved to complement the contour of the respective bearing means riding therein. Similarly, the inner surfaces 36 and 37 of the split ring flanges 25 and 26, respectively, are contoured to complement the respective bearing means riding therein. The bearing means may be rotatably coupled to the split ring flange by pins 28 as shown.

The flexible joint 13 further comprises an inner annular channel 29. As shown in FIG. 3, the inner annular channel 29 rides substantially concentrically within the outer annular channel 16. Either end of the inner annular channel 29 is adapted to engage a pipe, 30 and 31, respectively. Each pipe 30 and 31 has a socket 32 and 33, respectively, which engages either end of the inner annular channel 29. As shown, the socket 32 is positioned substantially on a center line with the first outer coupling 14, and the socket 33 is likewise positioned on a center line with the second outer coupling 15.

The section of the inner annular channel 29 that is positioned between the sockets 32 and 33 has a bearing means 34 at one end and a bearing means 35 at the other end thereof. As shown, the bearing means 34 and 35 may have a curved profile on their outer surfaces, 38 and 39, respectively. Similarly, the inner surfaces 40 and 41, respectively, of the sockets 32 and 33 may have a curved profile, although this is not required. The bearing means 34 and 35 ride within their respective sockets 32 and 33 and each bearing means together with its respective socket may comprise a ball and socket-type joint.

Figure 4:
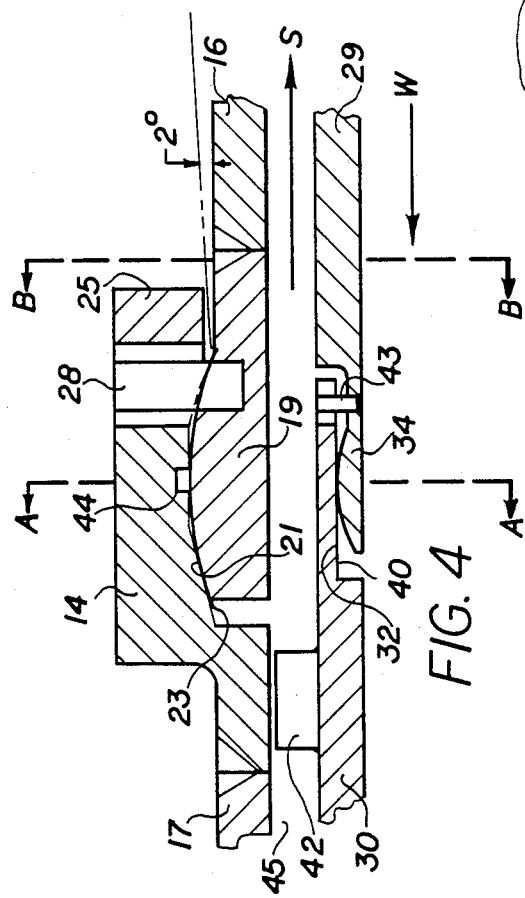
FIG. 4 is a sectional view of an enlarged portion of FIG. 3.
Figure 6:
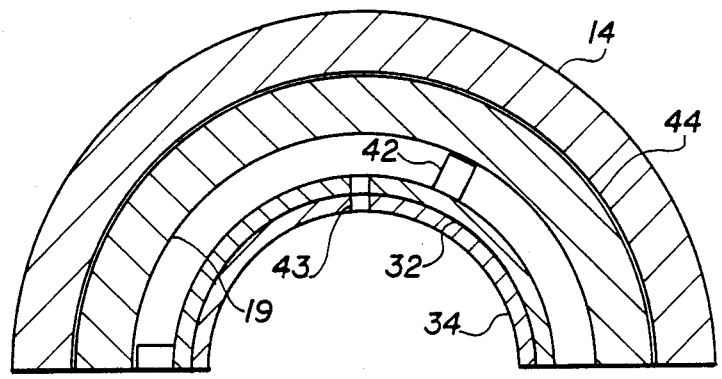
FIG. 6 is a cross sectional view taken along line A—A of FIG. 4.
Figure 7:
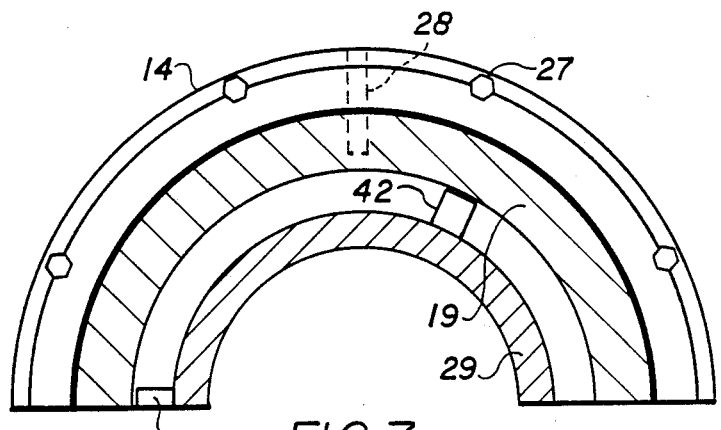
FIG. 7 is a cross sectional view taken along line B—B of FIG. 4.

As best seen in FIG. 4, the first outer coupling 14, the first bearing means 19, the socket 32, and the bearing means 34 all lie substantially along a common center line. Such an arrangement allows both the outer annular channel 16 and the inner annular channel 29 to flex at least 2° relative to the pipes 17, 18, 30 and 31. A greater degree of flex, as needed, may be accomplished by chamfering the split ring flange 25.

As shown in FIG. 4, a spacer flange 42 may be used to maintain a predetermined space 45 between the inner annular channel 29 and the outer annular channel 16. Also, a pin 43 may be used to rotatably couple the bearing means 34 to the socket 32. Packing materials, such as bronze or leather, 44, may be placed as shown to maintain a proper seal between the bearing means 19 and the outer coupling 14. FIG. 4 details the combustor side of the flexible joint 13, but the elements described therein are typical for the rotary joint side as well.

In addition to allowing at least a 2° flex, the flexible bearing provides a pneumatic seal, and, in turn, allows the flow of both water and steam. As shown in FIGS. 2 and 4, water flows through the flexible joint 13 from the rotary joint side towards the combustor through the inner annular channel 29, as indicated by arrow "W". Steam flows back from the combustor in the opposite direction, through the space 45 between the outer annular channel 16 and the inner annular channel 29, as indicated by arrow "S". The joint 13 allows the required degree of flexibility without significant leakage of either steam or water.

Although the invention has been described in detail in the foregoing for the purpose of illustration, it is to be understood that such detail is solely for that purpose and that variations can be made therein by those skilled in the art without departing from the spirit and scope of the invention except as described by the claims.

I claim:

1. A rotatable flexible joint for use as a rotary joint in a rotary combustor, said joint comprising:
   a. an outer annular channel having an outer bearing, said outer bearing riding within an outer coupling, said outer bearing being rotatably coupled to said outer coupling by means of a first coupling pin,
   b. an inner annular channel having an inner bearing, said inner channel riding substantially concentrically within said outer channel, said inner bearing riding within an inner coupling, said inner bearing being rotatably coupled to said inner coupling by means of a second coupling pin.

2. The flexible joint of claim 1 wherein a spacer maintains a predetermined space between the inner annular channel and outer annular channel.

3. The flexible joint of claim 1 wherein the outer bearing and outer coupling Comprise a ball and socket joint.

4. The flexible joint of claim 1 wherein the inner bearing and inner coupling comprise a ball and socket joint.

5. The flexible joint of claim 1 wherein water is capable of flowing through said inner channel and steam is capable of flowing through a space between said inner annular channel and said outer annular channel without significant leakage.

6. The flexible joint of claim 1 wherein said outer coupling includes a split ring flange for engaging said outer bearing.

7. A rotatable flexible joint capable of use as a coupling for a rotary combustor to a rotary joint, said flexible joint including an outer annular channel with a first outer coupling engaging one end of said outer annular channel, and a second outer coupling engaging the other end of said outer annular channel, said first outer coupling connecting one end of said flexible joint to a combustor, said second outer coupling connecting the other end of said flexible joint to a rotary joint, said outer annular channel further comprising a section positioned between said first and second outer couplings, said section including a first bearing at one end of said section and a second bearing at the other end of said section, said first bearing riding within said first coupling and being rotatably coupled thereto by means of a first coupling pin, said second bearing riding within said second coupling, and being rotatably coupled there to, by means of a second coupling pin, said flexible joint further comprising an inner annular channel riding substantially concentrically within said outer annular channel, said inner annular channel engaging at its one end a first socket and engaging at its other end a second socket, said first socket being positioned substantially axially with said first outer coupling, said second socket being positioned substantially axially with said second outer coupling, said inner annular channel further comprising a section positioned between said first and second socket, said section including a third bearing at one end and a fourth bearing at the other end, said third bearing riding within said first socket, said fourth bearing riding within said second socket.

8. The flexible joint of claim 7 wherein a spacer maintains a predetermined space between the inner annular channel and outer annular channel.

9. The flexible joint of claim 7 wherein each said outer coupling together with each said bearing riding therein comprises a ball and socket joint.

10. The flexible joint of claim 7 wherein the third bearing together with said first socket and the fourth bearing together with said second socket each comprise a ball and socket joint.

11. The flexible joint of claim 7 wherein water is capable of flowing through said inner channel and steam is capable of flowing through said outer channel in the space between said inner channel and said outer channel without significant leakage.

12. The flexible joint of claim 7 wherein said third bearing is coupled to said first socket and said fourth bearing is coupled to said second socket.

13. The flexible joint of claim 7 wherein each said first and second outer coupling includes a split ring flange for engaging, respectively, said first and second bearing.

14. The flexible joint of claim 7 wherein said flexible joint permits an angle of flex of at least 2°.

* * * * *